United States Patent [19]

Arix

[11] 4,071,007
[45] Jan. 31, 1978

[54] STOP AUTO THEFT

[76] Inventor: Robert J. Arix, 3rd P.O. Box 343, Racine, Ohio 45771

[21] Appl. No.: 717,269

[22] Filed: Aug. 24, 1976

[51] Int. Cl.² .................... H02G 3/00; B60R 25/00
[52] U.S. Cl. .................... 123/146.5 B; 123/198 DC; 180/114; 307/10 AT; 340/64; 123/198 B
[58] Field of Search ..... 123/198 B, 198 DC, 146.5 B; 180/114; 340/63, 64; 307/10 AT

[56] References Cited

U.S. PATENT DOCUMENTS

| | | | |
|---|---|---|---|
| 3,614,460 | 10/1971 | Hall | 180/114 X |
| 3,628,056 | 12/1971 | Buchanon | 307/10 AT |
| 3,634,697 | 1/1972 | MacFarlane | 340/64 UX |
| 3,783,303 | 1/1974 | Johnson | 180/114 X |
| 3,784,839 | 1/1974 | Weber | 180/114 X |

Primary Examiner—Charles J. Myhre
Assistant Examiner—Ira S. Lazarus

[57] ABSTRACT

An anti-theft device for a motor vehicle includes a starter-connected ignition switch which has a first accessible terminal, and a second substantially non-accessible terminal connected to a third substantially non-accessible terminal of a voltage dropping means, such as a resistor. A relay has a coil and at least a pair contacts closable by operating the ignition switch, and is connected in series with a circuit breaker, the voltage dropping means, the ignition switch and a voltage source. The circuit breaker trips at a predetermined current setting, and the coil is designed to burn out at a current just exceeding the predetermined current. Periodically openable contact-means actuate the motor vehicle's engine and are energizable by the pair of contacts. The circuit breaker trips upon a thief shorting the accessible terminals, and the relay coil burns out upon the thief shorting the circuit breaker.

2 Claims, 1 Drawing Figure

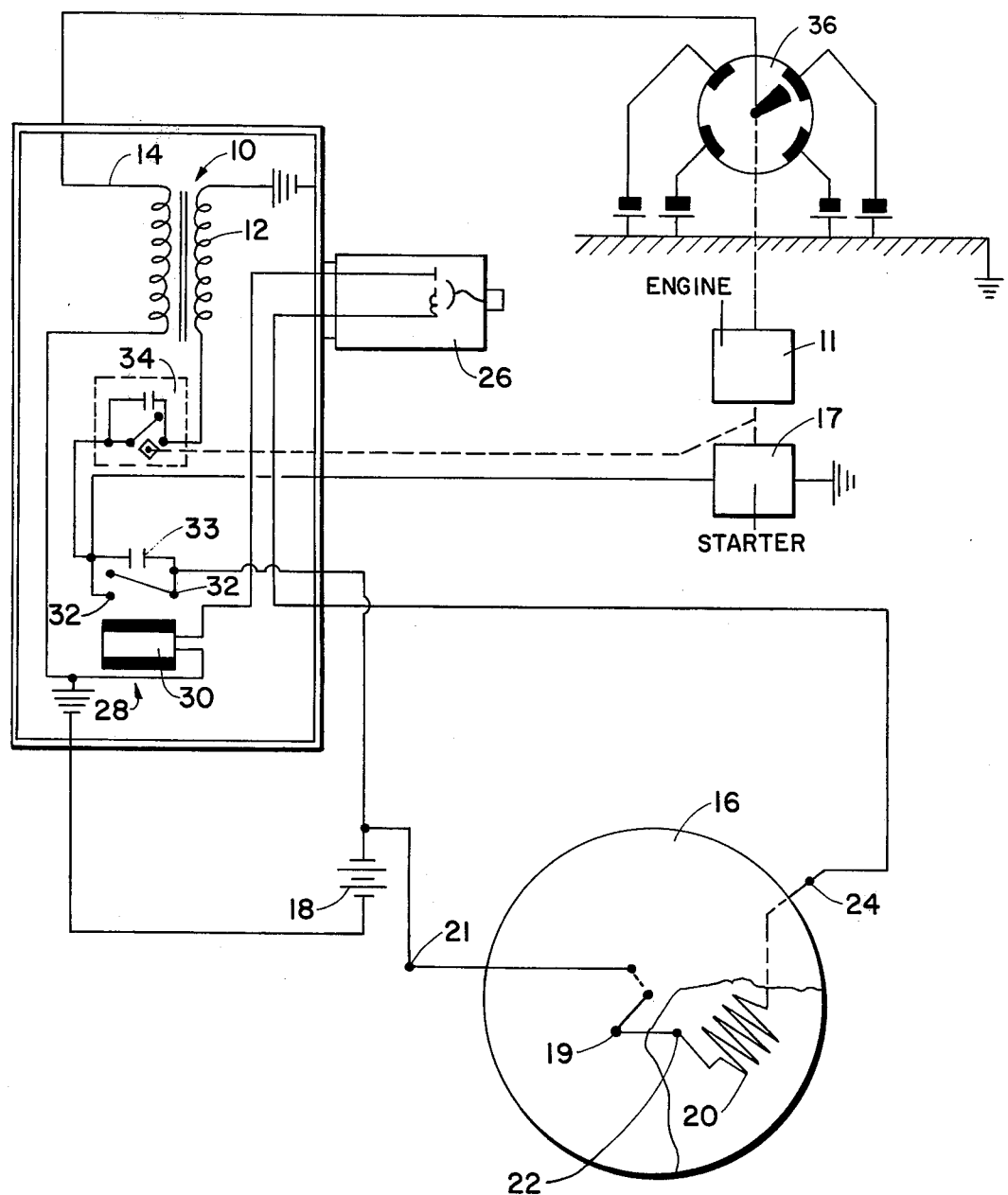

STOP AUTO THEFT

BACKGROUND OF THE INVENTION

1. Field of the Invention

The field of the present invention relates to an anti-theft device for a motor vehicle.

2. Description of the Prior Art

An anti-theft device for a motor vehicle is known in which a circuit component connected to the ignition system of a motor vehicle selectably opens and closes the circuit of the ignition system, thereby controlling the starting of the engine of the vehicle. Short-circuiting of the component, which is a relay-operated switch, makes it possible, however, to start the engine so that relatively inexpensive means have been sought to create an anti-theft device for a motor vehicle which would be harder to circumvent.

SUMMARY OF THE INVENTION

It is accordingly, an object of my invention to devise an anti-theft device for a motor vehicle where the theft of the vehicle is prevented even if an additional circuit component intended to safeguard the vehicle from theft is short circuited or by-passed.

I accordingly provide an anti-theft device for a motor vehicle having an internal combustion engine and an ignition system, which includes a transformer having a primary winding and a stepped-up secondary winding, a distributor connected to the secondary winding, and a starter-connected ignition switch for starting the engine. The switch has a first accessible terminal and a second substantially non-accessible terminal; a voltage source is connected to the ignition switch, and voltage-dropping means are provided for dropping the voltage of the voltage source. The voltage-dropping means has a third substantially non-accessible terminal connected to the second terminal, and includes a fourth accessible terminal; a circuit breaker is connected to the ignition switch and is set to trip at a predetermined current. A relay is provided which has a coil energizable by the ignition switch, and at least a pair of contacts closable by operating the ignition switch; the coil is designed to burn out at a current just exceeding the predetermined current, and the ignition switch, the voltage dropping means, the circuit breaker and the relay are connected in series across the voltage source. Periodically openable contact means are actuated by closure of the pair of contacts, and the latter, the contact means and the voltage source are connected in series with the transformer primary winding. The circuit breaker trips upon the thief shorting the accessible terminals, and the relay coil burns out upon the thief shorting the circuit breaker; the voltage-dropping means is preferably a resistor.

BRIEF DESCRIPTION OF THE DRAWINGS

My invention will be better understood by means of the accompanying drawing, the sole FIGURE of which illustrates a schematic circuit diagram of the anti-theft device, according to my invention.

DESCRIPTION OF THE PREFERRED EMBODIMENT

The anti-theft device for a motor vehicle which has an internal combustion engine 11 and an ignition system, includes a transformer 10 which has a primary winding 12 and a stepped-up secondary winding 14, a distributor 36 connected to a starter 17 for starting the engine 11. A switch 16 has a first accessible terminal 21, a second substantially non-accessible terminal 19, and a battery 18 supplying a voltage is connected to the ignition switch 16. Voltage-dropping means 20 are provided for dropping the voltage of the voltage source 18; the voltage-dropping means 20 are provided with a third substantially non-accessible terminal 22 connected to the second terminal 19, and with a fourth accessible terminal 24. A circuit breaker 26 is connected to the ignition switch 16, and is set to trip at the predetermined current. A relay 28 has a coil 30 energizable by the ignition switch 16, and at least a pair of contacts 32 closable by operating the ignition switch 16. The coil 30 is designed to burn out at a current just exceeding the predetermined current, and the ignition switch 16, the voltage dropping means 20, the circuit breaker 26 and the relay 28 are connected in series across the voltage source 18. Periodically openable contact means 34 are actuable by closure of the pair of contacts 32, and the latter, the contact means 34 and the voltage source 18 are connected in series with the primary transformer winding 12; the voltage-dropping means 20 is preferably a resistor. The circuit breaker 26, upon a thief shorting the accessible terminals 21 and 24, trips, and the relay coil 30 burns out upon the thief shorting the circuit breaker 26, so that the thief cannot start the engine of the motor vehicle.

Although the invention has been described with respect to a preferred version thereof, it is to be understood that it is not to be so limited since changes can be made therein which are within the full intended scope of the appended claims.

What is claimed is:

1. An anti-theft device in combination with motor vehicle having an internal combustion engine and an ignition system, said device comprising:
   a transformer having a primary winding and a stepped-up secondary winding;
   a distributor connected to said secondary winding;
   a starter-connected ignition switch for starting the engine, said switch having a first accessible terminal and a second substantially non-accessible terminal;
   a voltage source connected to said first accessible terminal of said ignition switch;
   voltage-dropping means for dropping the voltage of said voltage source, said voltage-dropping means having a third substantially non-accessible terminal connected to said second terminal, and a fourth accessible terminal;
   a circuit breaker connected to said fourth accessible terminal of ignition switch and set to trip at a predetermined current;
   a relay having a coil connected to, and energizable by said ignition switch through said circuit breaker, and at least a pair of contacts closable by operating said ignition switch, one of said contacts being connected to said voltage source, said coil being designed to burn out at a current just exceeding said predetermined current, said ignition switch, said voltage dropping means, said circuit breaker and said relay being connected in series across said voltage source; and
   periodically openable contact means actuable by closure of said pair of contacts, the latter, said contact means, and said voltage source being connected in series with said primary winding, whereby said circuit breaker trips upon a thief shorting said accessible terminals and the relay coil burns out upon the thief shorting said circuit breaker comma thus preventing the closure of said pair of contacts and actuation of said periodically openable contact means.

2. An anti-theft device according to claim 1, wherein said voltage-dropping means is a resistor.

* * * * *